UNITED STATES PATENT OFFICE.

ARCHIBALD McINTYRE DE WITT, OF PITTSTON, PENNSYLVANIA.

IMPROVEMENT IN REMEDIES FOR FEVER AND AGUE.

Specification forming part of Letters Patent No. 178,839, dated June 20, 1876; application filed April 17, 1876.

*To all whom it may concern:*

Be it known that I, A. McI. DE WITT, of Pittston, in the county of Luzerne and State of Pennsylvania, have invented certain new and useful Improvements in Medicine; and I do hereby declare the following to be a full, clear, and exact description of the invention, such as will enable others skilled in the art to which it pertains to make and use it.

My invention relates to medicines, and has as its object the cure of fever and ague, intermittent and bilious fever, dyspepsia, loss of appetite, sour stomach, liver complaint, and general debility.

With such an end in view, it consists of a compound having the following ingredients, substantially in the parts and proportions to wit:

One quart whisky; twenty grains quinine; one and a half ounce Peruvian bark; one-fourth ounce, liquid measure, essence cinnamon; one-fourth ounce, liquid measure, spirits camphor; one-fourth ounce, liquid measure, spirits turpentine; one-eighth ounce, liquid measure, laudanum.

To the above admixture I may add a further stimulant, such as brandy, gin, rum, or wine; and it is apparent that by flavoring the compound with any ingredient or extract to vary its sensitive taste I do not depart from the spirit of my invention or discovery, but same may be immaterially used. The product of all the foregoing may be sealed in bottles, as is usual, and placed upon the market, as is agreeable.

The several ingredients may be mixed successively or conjointly, and thereafter placed in a receptacle and thoroughly stirred together, so that the resulting product shall hold in solution the several ingredients composing the same.

Having fully described my invention, what I claim as new, and desire to secure by Letters Patent, is—

A medicine for the cure of fever and ague, dyspepsia, &c., consisting of whisky, quinine, Peruvian bark, essence of cinnamon, laudanum, and respective spirits of camphor and turpentine, in the parts and proportions substantially as set forth.

In testimony that I claim the foregoing I have hereunto set my hand this 15th day of April, 1876.

ARCHIBALD McINTYRE DE WITT.

Witnesses:
   O. F. GAINES,
   JOSEPH HILEMAN.